United States Patent
Kotera (10) Patent No.: US 7,048,664 B2
(45) Date of Patent: May 23, 2006

(54) LINK PLATE FOR A SILENT CHAIN

(75) Inventor: Tetsuji Kotera, Nabari (JP)

(73) Assignee: BorgWarner Morse TEC Japan K.K., Nabari (JP)

( * ) Notice: Subject to any disclaimer, the term of this patent is extended or adjusted under 35 U.S.C. 154(b) by 43 days.

(21) Appl. No.: 10/218,731

(22) Filed: Aug. 14, 2002

(65) Prior Publication Data

US 2003/0045388 A1   Mar. 6, 2003

(30) Foreign Application Priority Data

Aug. 23, 2001   (JP) ............... 2001-253020

(51) Int. Cl.
*F16G 13/04*   (2006.01)
(52) U.S. Cl. .................. 474/212; 474/215
(58) Field of Classification Search ........... 474/212, 474/155, 213, 214, 215
See application file for complete search history.

(56) References Cited

U.S. PATENT DOCUMENTS

| | | | |
|---|---|---|---|
| 2,725,755 A | 12/1955 | Rippelle et al. | ........... 74/229 |
| 6,159,122 A * | 12/2000 | Kanehira et al. | ........... 474/212 |
| 6,334,828 B1 * | 1/2002 | Suzuki | ........... 474/212 |
| 6,435,996 B1 | 8/2002 | Horie et al. | ........... 474/213 |
| 6,533,691 B1 * | 3/2003 | Horie et al. | ........... 474/213 |
| 2001/0007842 A1 | 7/2001 | Suzuki et al. | ........... 474/213 |

FOREIGN PATENT DOCUMENTS

JP   60164042   8/1984

* cited by examiner

*Primary Examiner*—Marcus Charles
(74) *Attorney, Agent, or Firm*—Brown & Michaels, PC; Greg Dziegielewski (57) ABSTRACT

A link plate for silent chains includes a pair of teeth, each formed of an inside flank and an outside flank and a pair of pin apertures. A moment of force around a pin $M=F \times Lo$, where F is a force applied by a sprocket tooth against the outside flank, and Lo is a length of a perpendicular drawn from a center O of a pin aperture to an action line of the force, is decreased by decreasing Lo. The link plate engages a sprocket tooth on an intersection between a straight line n and a flank, line n and the direction of a central line connecting each O forming a pressure angle $\alpha$, and contacting a circle having a center O and a radius $r<0.25 \times P$, where P is a pin aperture pitch. Also, $\alpha$ of the outside flank satisfies an inequality, $32° \leq \alpha < 34°$, to lessen the force.

12 Claims, 7 Drawing Sheets

FIG. 3B $\alpha_2 > \alpha_1$

Prior Art

FIG. 7

Prior Art

LINK PLATE FOR A SILENT CHAIN

BACKGROUND OF THE INVENTION

1. Field of the Invention

The present invention relates to a link plate for a silent chain, and more particularly, to an improvement of structure to decrease noise of the silent chain during operation.

2. Description of Related Art

A silent chain is generally constructed from a plurality of link plates each having a pair of teeth and pin apertures and arranged in lateral and longitudinal directions and joined pivotably by connecting pins.

There are various frequencies in noise that occurs during operation of a silent chain. In these frequencies, a frequency having the greatest intensity forms a so-called primary oscillation of engagement. Since such primary oscillation of engagement gives objectionable impression to ears of human beings, various efforts and improvements have been made to decrease the primary oscillation of engagement.

Figure 6:
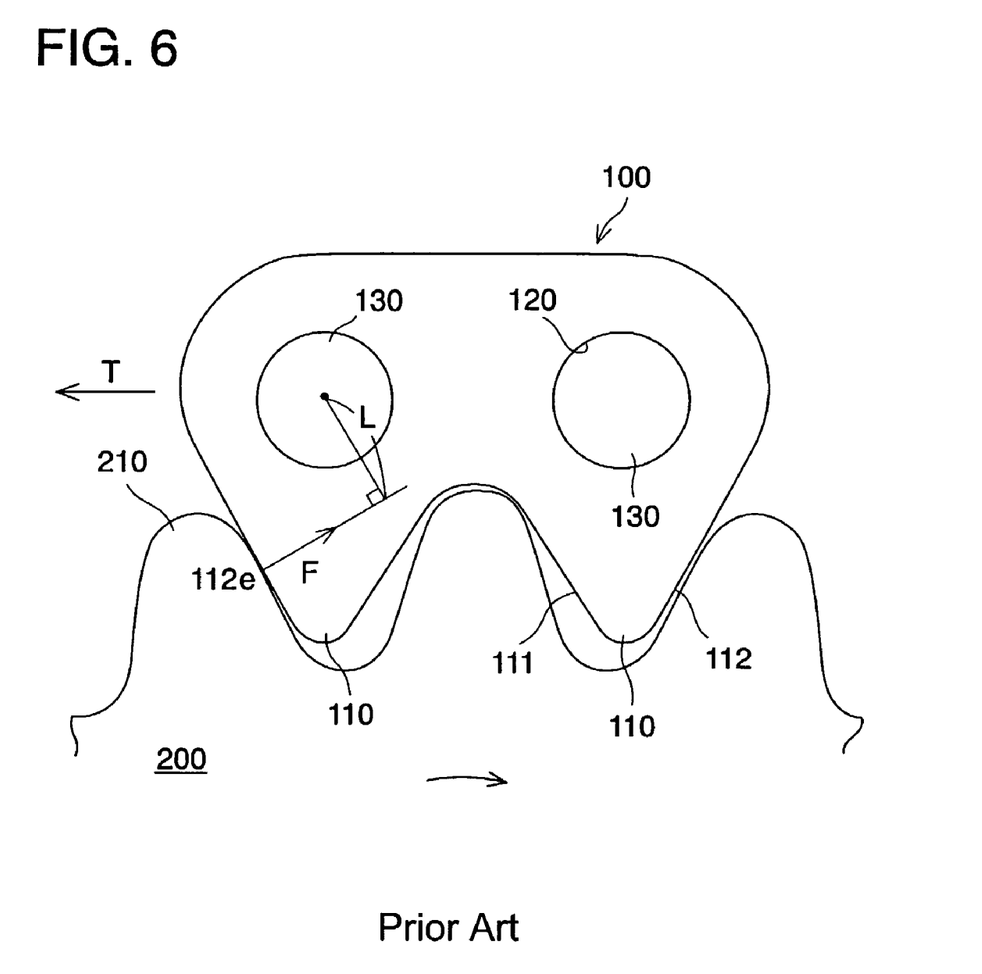
FIG. 6 is a front elevational view of a portion of a prior art silent chain transmission device, showing a link plate of a silent chain in engagement with a corresponding sprocket.

Referring to FIG. 6, the around-the-pin moment will be explained. FIG. 6 shows a state of engagement of a link plate in a specified row of a silent chain with a sprocket teeth. A link plate 100 is engaged with a sprocket 200 rotating in an arrow mark direction. The link plate 100 includes a pair of teeth 110 and pin apertures 120 having pins 130 inserted thereinto. Each of the teeth 110 is formed of an inside flank 111 and an outside flank 112. A tooth 210 of the sprocket 200 is in contact with the outside flank 112 of one of the teeth 110 of the link plate 100.

In such a state of engagement, tension T is applied to each row of link plates forming a silent chain. On the other hand, force F from the sprocket tooth 210 is applied to an engagement point 112e on the outside flank 112 of the link plate 100. When a length of a perpendicular drawn from a center of a pin aperture to an action line of the force F is L, a moment M around a pin is shown by M=F×L.

SUMMARY OF THE INVENTION

Figure 2:
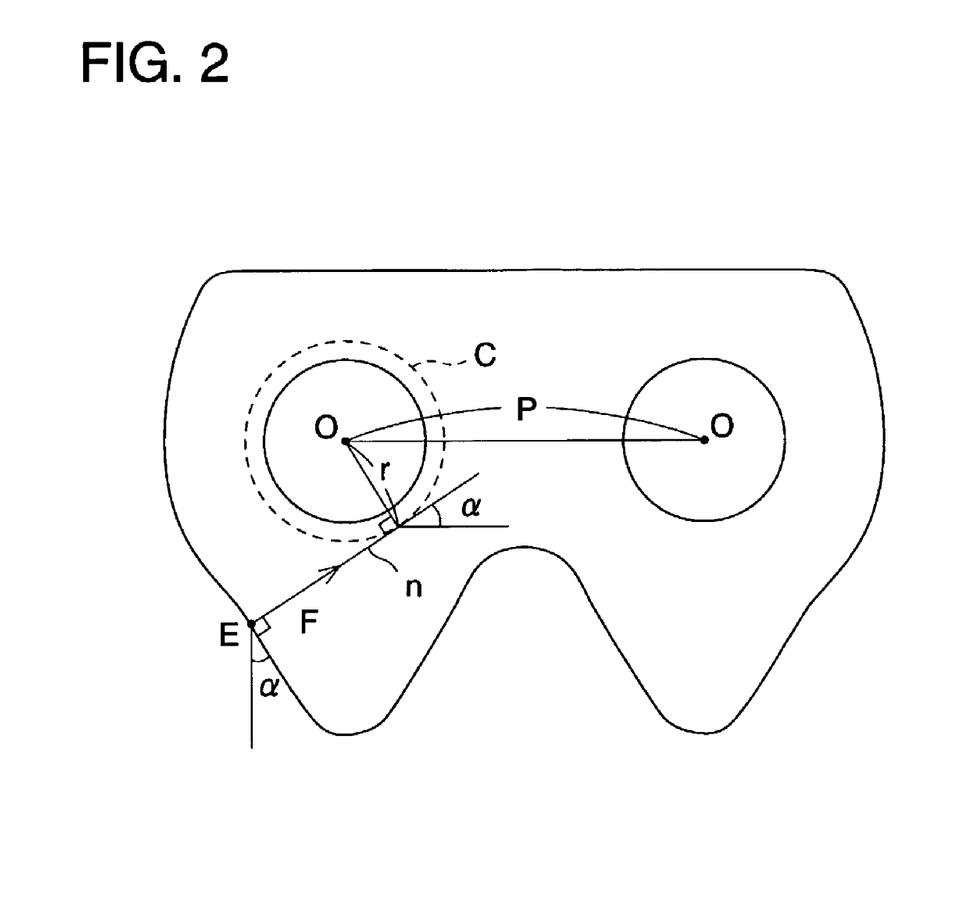
FIG. 2 is a front elevational view of a link plate of FIG. 1, illustrating an engaging point of a link plate with a sprocket tooth.

A link plate of a silent chain according to the present invention has a pair of teeth each formed of an inside flank and an outside flank, and a pair of pin apertures to insert connecting pins. As shown in FIG. 2, the link plate has an engaging point E engaged with a sprocket tooth on an intersection between a straight line n and a flank. The straight line n is at an angle $\alpha$ ($\alpha$: pressure angle of a flank) with the direction of a central line connecting each center O of pin apertures and in contact with a circle C. The circle C has a center located at a center O of the pin aperture and a radius r, which is equal to or smaller than 0.25×P (P: pin aperture pitch or distance between centers of pin apertures).

As is seen from FIG. 2, the straight line n corresponds to an action line of force F applied from the sprocket tooth to the engaging point E of the link plate. The radius r of the circle C corresponds to a length of a perpendicular drawn from the center O of the pin aperture to the action line of the force F at the engaging point E. Also, the radius r satisfies an inequality, r≦0.25×P (as opposed to a prior art link plate, in which there was an inequality, r>0.25×P), and the radius r is small. Thus, around-the-pin moment M (=F×r) is relatively small, thereby decreasing primary oscillation of engagement. Moreover, in the present invention, an arm length of around-the-pin moment can be shortened irrespective of the size of the pressure angle $\alpha$ of the flank. Preferably, the pressure angle $\alpha$ of the flank satisfies an inequality, $\alpha$>30°.

The connecting pin may be a round, cylindrical pin of a round sectional shape. Alternatively, the connecting pin may be a rocker joint formed of a rocker pin and a joint pin. In a rocker joint type silent chain, an intersecting point O' (not shown) between a rocker pin and a joint pin with the silent chain linearly extended corresponds to a center O of the pin aperture for a round pin. In the case of a rocker joint type silent chain as well, the arm length of around-the-pin moment can be shortened regardless of the size of the pressure angle $\alpha$ of the flank. Thus, around-the-pin moment can be made relatively small, thereby decreasing primary oscillation sound of engagement.

Therefore, from a viewpoint of lessening the around-the-pin moment and preventing tooth jumping of a sprocket tooth, the pressure angle $\alpha$, more preferably, satisfies an inequality, 32°≦$\alpha$<34°. In this case, not only an arm length of the moment but also a component of a force constituting the moment can be lessened, thereby further decreasing around-the-pin moment, thus further reducing primary oscillation sound.

BRIEF DESCRIPTION OF THE DRAWING

For a more complete understanding of the invention, reference should be made to the embodiments illustrated in greater detail in the accompanying drawings and described below by way of examples of the invention. In the drawings, which are not to scale.

DETAILED DESCRIPTION OF THE INVENTION

Moment of a force around a connecting pin (hereinafter called "around-the-pin moment") that is applied to an engagement surface of a link plate at the time of meshing with a sprocket tooth greatly influences the primary oscillation of engagement. According to the teachings of this invention, when around-the-pin moment M becomes greater, fluctuation in tension easily occurs, and such torque fluctuation occurs synchronized with engaging frequency, thereby causing primary oscillation of engagement, which transmits to a peripheral device and becomes a source of engaging sound. Therefore, primary oscillation sound will be decreased by decreasing around-the-pin moment.

Figure 1:
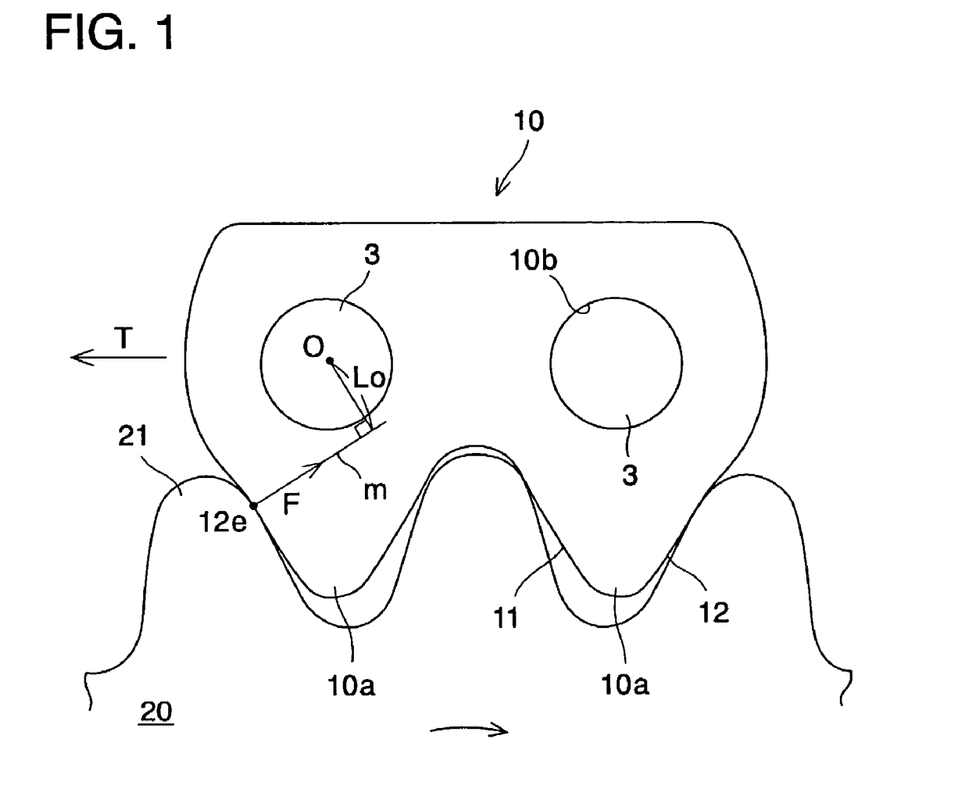
FIG. 1 is a front elevational view of a portion of a silent chain transmission device according to an embodiment of the present invention, showing a link plate of a silent chain in engagement with a corresponding sprocket.

Referring now to the drawings, FIG. 1 shows a portion of a silent chain having a plurality of rows of link plates provided along the length of the chain, illustrating a link plate of a specified row engaging with a sprocket. As shown in FIG. 1, a link plate 10 includes a pair of teeth 10a and pin apertures 10b. Each of the teeth 10a is formed of an inside flank 11 and an outside flank 12. In each of the apertures 10b is inserted a round, cylindrical connecting pin of a round sectional shape adapted to pivotally connect adjacent rows of link plates. At a point 12e on the outside flank 12, the link plate 10 is in engagement with the teeth 21 of the sprocket 20 rotating in the direction of an arrow mark.

In such an engagement state, tension T is applied to the link row including the link plate 10. A compressive force F is applied from the sprocket tooth 21 to the engagement point 12e on the outside flank 12 of the link plate 10. At this time, around-the-pin moment M is defined by the equation, M=F×Lo, wherein Lo is a length of a perpendicular drawn from a center O of a pin aperture 10b to an action line m of the force F.

The position of the engagement point of the link plate 10 will be explained using FIG. 2, which shows a link plate of FIG. 1. In FIG. 2, first, a circle C is drawn, with its center located at the center O of a pin aperture and a radius r, which is equal to or smaller than 0.25×P (where P is the pin aperture pitch or distance between the centers of the pin apertures). Then, a straight line n is drawn that is at an angle α (where a is the flank pressure angle) with the direction of a center line connecting each center O of the pin apertures and that is tangent to the circle C. An intersection E between the straight line n and the outside flank 12 will be an engaging or mating point with a sprocket tooth.

As is seen from FIG. 2, the straight line n corresponds to an action line of the force F (or the action line m of FIG. 1) applied to the engaging point E on the link plate from the sprocket tooth. The radius r of the circle C corresponds to a length of the perpendicular (or Lo of FIG. 1) drawn from the center O of the pin aperture to the action line of the force F at the engaging point E. Also, the radius r satisfies r≦0.25×P, and r is relatively small. Thus, around-the-pin moment M (=F×r) is relatively small, thereby decreasing primary oscillation sound. Moreover, in this case, the arm length of the around-the-pin moment can be lessened irrespective of the size of the flank pressure angle α.

Figure 3A:
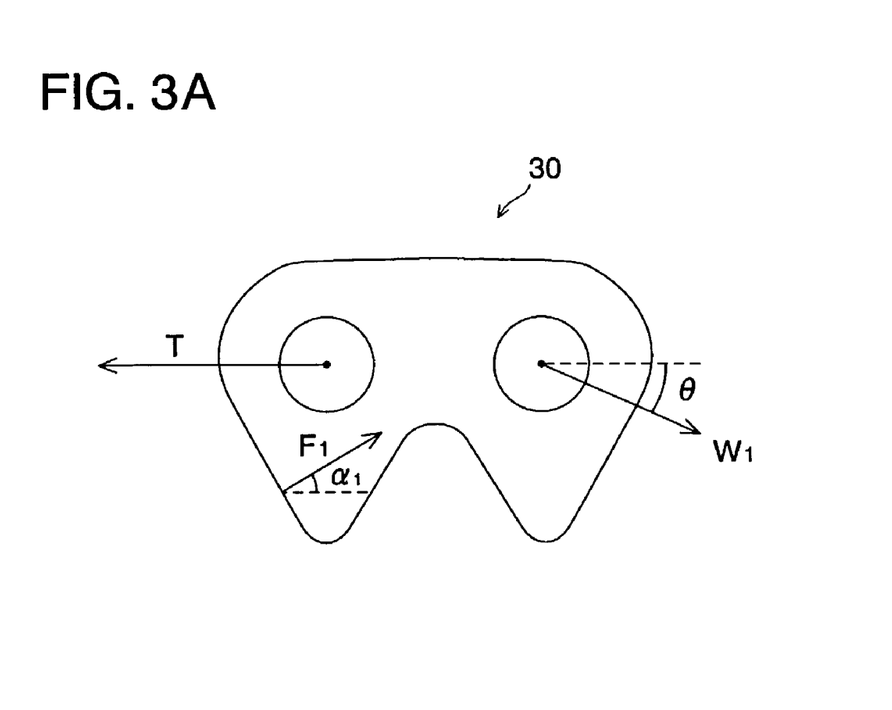
FIG. 3A is a front view of a link plate having a flank pressure angle $\alpha$1, showing forces applied to the link plate.
Figure 3B:
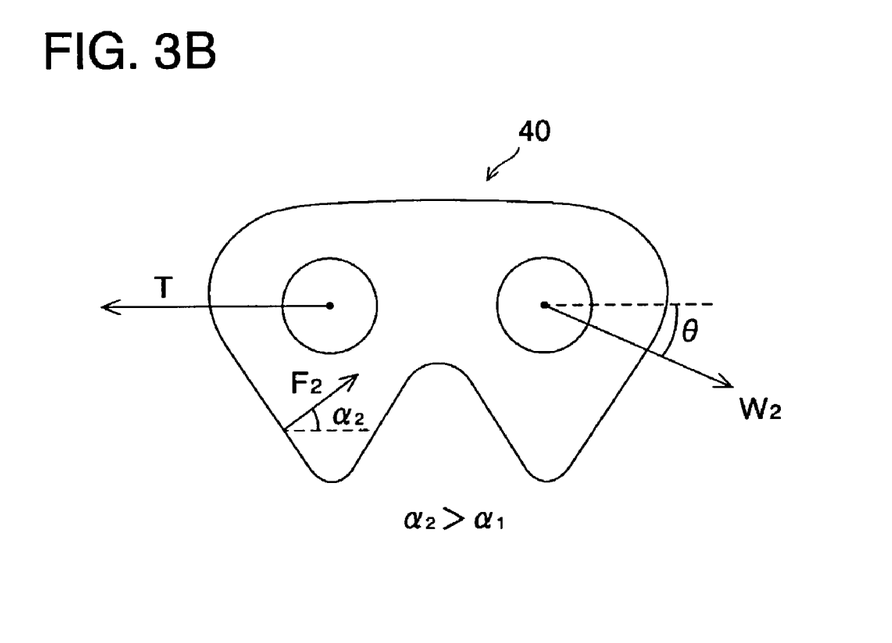
FIG. 3B is a front view of a link plate having a applied pressure angle $\alpha$2, showing forces applied to the link plate.

FIG. 3A shows a link plate having a flank pressure angle of 30 degrees or less, and FIG. 3B shows a link plate having a flank pressure angle more than 30 degrees. In the drawings, the angle $\alpha_1$ for the link plate 30 is 30°, and the angle $\alpha_2$ for the link plate 40 is 32°.

To the link plate 30 are applied a chain tension T, a compressive force $F_1$ from the sprocket tooth at the engaging point of the flank, and a tensile force $W_1$ from the link plate adjacent to the link plate 30. These forces T, $F_1$ and $W_1$ are balanced. The tensile force $W_1$ is at an angle θ with the direction along the center line of the pin apertures.

To the link plate 40 are applied a chain tension T, a compressive force $F_2$ from the sprocket tooth at the engaging point of the flank, arid a tensile force $W_2$ from the link plate adjacent to the link plate 40. These forces T, $F_2$ and $W_2$ are balanced. The tensile force $W_2$ is at an angle θ with the direction along the center line of the pin apertures.

Figure 4A:
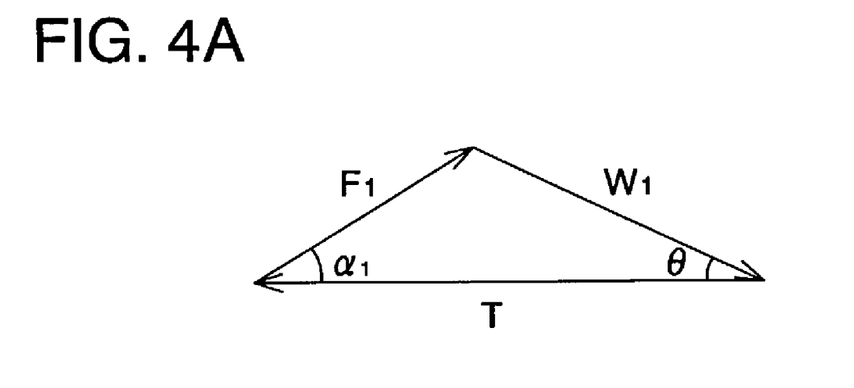
FIG. 4A shows a triangle of forces applied to the link plate of FIG. 3A having a flank pressure angle $\alpha$1.
Figure 4B:
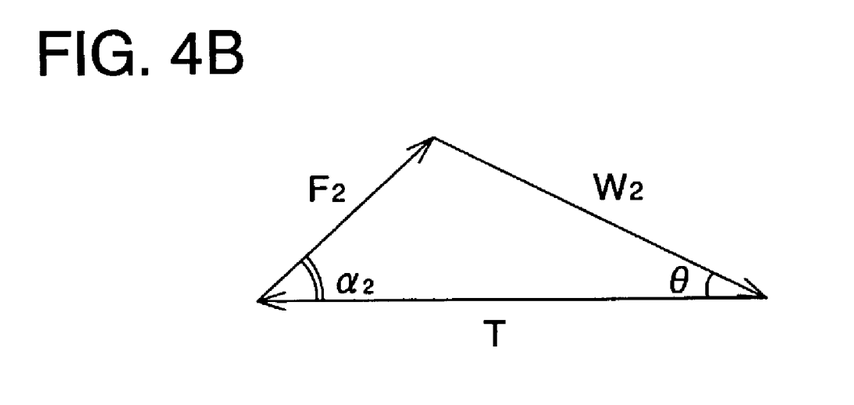
FIG. 4B shows a triangle of forces applied to the link plate of FIG. 3B having a flank pressure angle $\alpha$2.
Figure 4C:
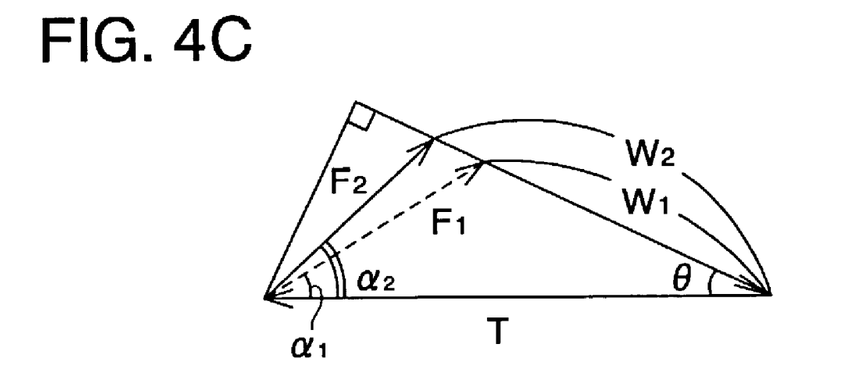
FIG. 4C shows a combination of FIGS. 4A and 4B.

FIG. 4A shows a triangle of forces for the link plate 30 and FIG. 4B shows a triangle of forces for the link plate 40. FIG. 4C shows a combination of FIGS. 4A and 4B. In FIG. 4C, the pressure angle $\alpha_2$ is exaggerated for the purpose of illustration.

As is clearly seen from FIG. 4C, for the compressive forces $F_1$ and $F_2$, an inequality, $F_2<F_1$ is satisfied. In other words, the compressive force applied from the sprocket tooth becomes smaller when the pressure angle becomes greater than 30 degrees. Thus, around-the-pin moment can be made relatively smaller, thereby reducing primary oscillation sound of engagement.

The flank pressure angle α preferably satisfies α>30°. The reason for this is that in the case of a pressure angle greater than 30 degrees, as above-mentioned, a compressive force acting from the sprocket tooth becomes smaller, thus making the around-the-pin moment relatively smaller, thereby decreasing primary oscillation sound.

Also, the flank pressure angle α preferably satisfies α<34°. The reason for this is that in the case of the pressure angle of 34 degrees or more, the tilting angle of the flank that is declined from the direction of the radius of the sprocket becomes greater, thereby causing the tooth jumping of the sprocket. Moreover, the pressure angle α more preferably satisfies α≧32°.

Therefore, from the standpoint of lessening the around-the-pin moment and preventing the tooth jumping of the sprocket, the pressure angle α more preferably satisfies 32°≦α≦34°. In this case, since the arm length of the moment can be made smaller and the component of the force constituting the moment can be lessened, the around-the-pin moment is further decreased and primary oscillation sound is further reduced.

Figure 5:
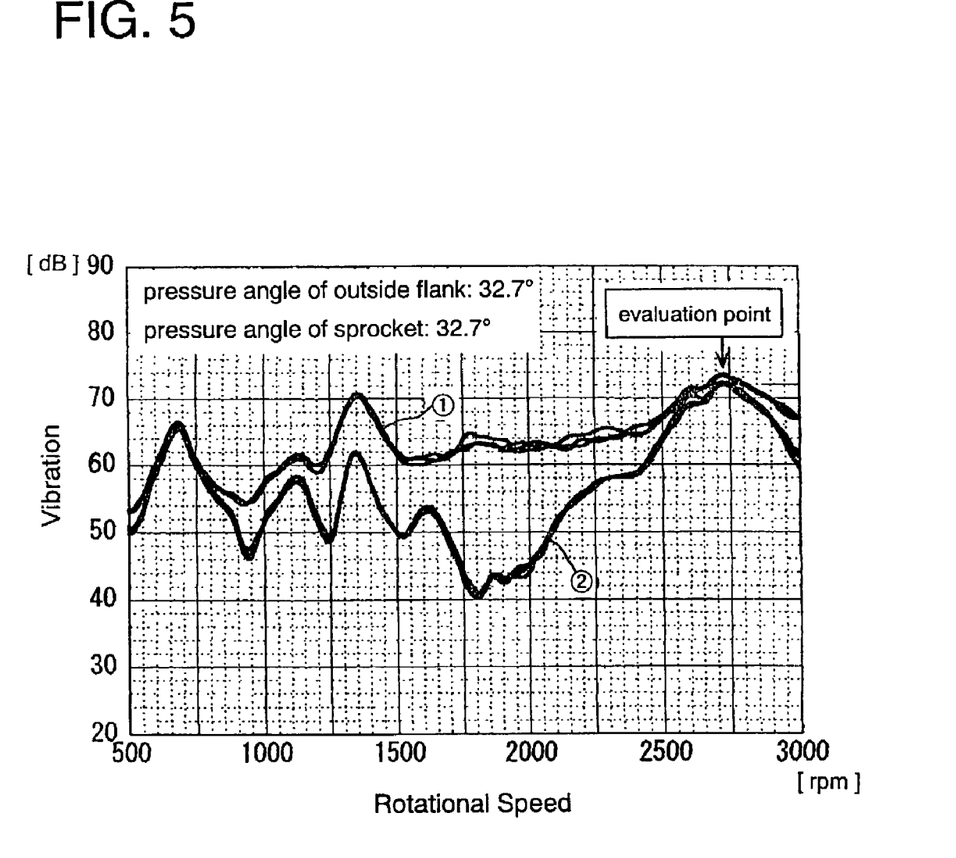
FIG. 5 is a graph showing the result of a noise test of a silent chain transmission device according to the present invention.

FIG. 5 shows the result of the noise test of a silent chain transmission device according to the preferred embodiment of the present invention. In this test, the pressure angle of the outside flank of the link plate is 32.7°, and the pressure angle of the sprocket tooth, or the pressure angle at the engaging point with the outside flank of the link plate, is also 32.7°. The arm length of the around-the-pin moment is 0.23×P (where P is the pin aperture pitch). In FIG. 5, a rotational speed in a horizontal axis shows a rotating speed of a drive sprocket (and also a driven sprocket) of a test equipment, and a vibration or oscillation in a vertical axis shows a measured value measured by a noise meter at each rotating speed. Graph line (1) shows an overall sound representing oscillation of the whole device, and graph line (2) shows a primary oscillation sound.

In FIG. 5, an evaluation point is at the rotating speed of 2,450 rpm where the highest oscillation is measured. The primary oscillation at this evaluation point is 72 dB.

Figure 7:
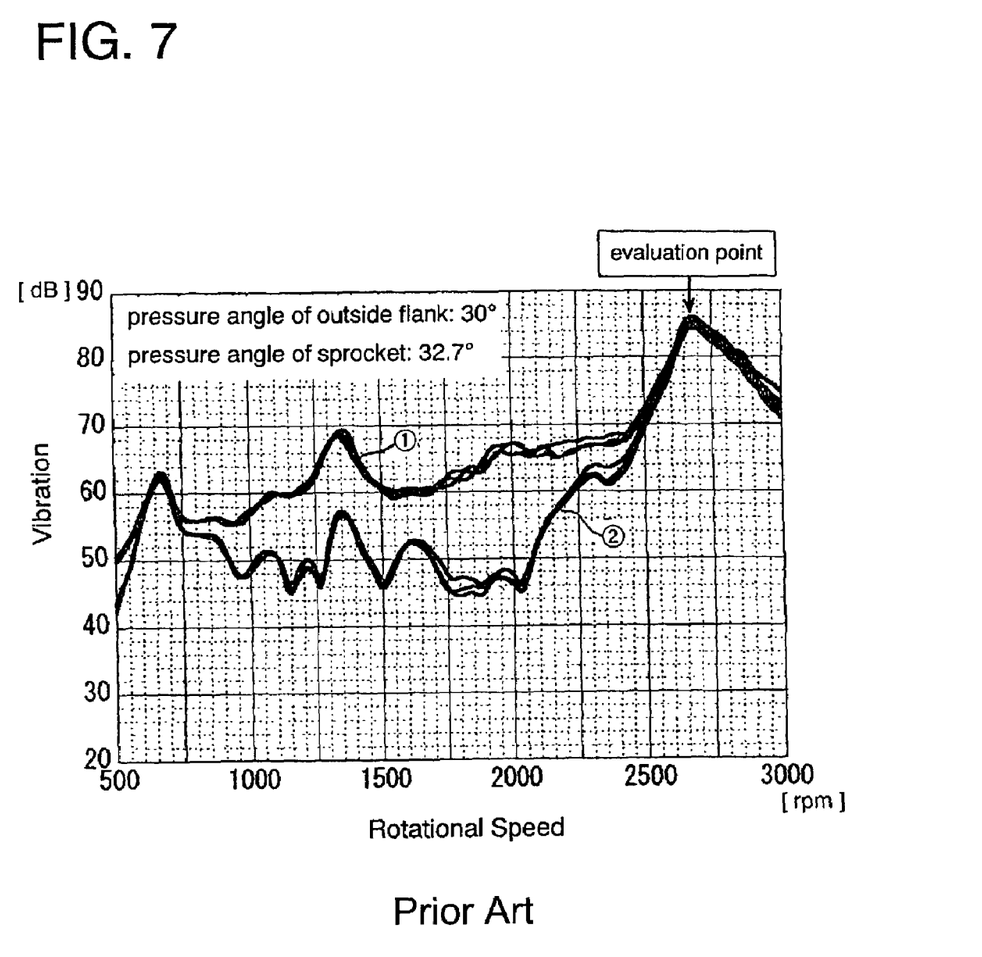
FIG. 7 is a graph showing the result of a noise test of a prior art silent chain transmission device.

On the other hand, FIG. 7 shows the result of the noise test of a prior art silent chain transmission device. In this test, the pressure angle of the outside flank of the link plate is 30°, and the pressure angle of the sprocket tooth is 32.7°. The arm length of the around-the-pin moment is 0.35×P. The other conditions are the same as those of the noise test in FIG. 5.

In FIG. 7, an evaluation point is at the rotating speed of 2,675 rpm where the highest oscillation is measured. The primary oscillation at this evaluation point is 84 dB.

In comparison between FIGS. 5 and 7, according to the embodiment of the present invention, the primary oscillation decreases 12 dB.

In the above-mentioned preferred embodiment, there is shown an example where the outside flank pressure angle α satisfies 32°≦α≦34° and the arm length of the around-the-pin moment is lessened, but the present invention is not limited to this example.

The pressure angle α satisfying 32°≦α≦34° can solely lessen the component of the force constituting the around-the-pin moment, thereby decreasing the moment and thus, reducing the primary oscillation sound. Alternatively, the shortened arm length of the around-the-pin moment can solely decrease the around-the-pin moment, thereby reducing the primary oscillation sound.

Also, the preferred embodiment describes the pressure angle of the outside flank only, but for the link plate engaging with the sprocket tooth at the inside flank, the pressure angle at the inside flank should be considered.

Furthermore, the present invention can be applied to a rocker joint type silent chain having a plurality of sets of a rocker pin and a joint pin. In this case, the intersection O' (not shown) between the rocker pin and the joint pin with the silent chain linearly extended corresponds to the center O of the pin aperture of the link plate in the preferred embodiment. In this case as well, similarly to the preferred embodiment, the arm length of the around-the-pin moment can be lessened irrespective of the size of the flank pressure angle α, thus decreasing the around-the-pin moment, thereby reducing the primary oscillation sound. Also as with the preferred embodiment, by suitably predetermining the pressure angle α, the component of the force forming the moment can be lessened and the around-the-pin moment can be decreased, thereby reducing the primary oscillation sound, and the tooth jumping of the sprocket can be prevented.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A link plate for a silent chain, in which a plurality of said link plates are arranged in lateral and longitudinal directions and joined pivotably by connecting pins, said link plate having a pair of teeth each formed of an inside flank and an outside flank and a pair of pin apertures to insert said connecting pins thereinto, said link plate having an initial engaging point (E) with a tooth of a sprocket, at a time of meshing of said link plate with said sprocket, on an intersection between said inside flank or said outside flank and a straight line (n) normal to the inside flank or the outside flank, said straight line (n) and the direction of a central line connecting each center (O) of pin apertures forming a pressure angle ($\alpha$), and being in tangential contact with a circle (C), said circle (C) having a center located at the center (O) of said pin aperture and a radius (r)$\leq$0.25×(P), where (P) is a pin aperture pitch.

2. The link plate of claim 1, in which the connecting pins are round pins, and (P) is the distance between centers of said pair of pin apertures.

3. The link plate of claim 1, in which the connecting pins are a rocker pin and a joint pin in each pin aperture, and (P) is a distance between the pair of pin apertures measured between contact points of each rocker pin with each joint pin in each pin aperture when said chain is pulled straight.

4. The link plate of claim 1, wherein said pressure angle ($\alpha$) satisfies an inequality, ($\alpha$)>30°.

5. The link plate of claim 4, wherein said pressure angle ($\alpha$) satisfies an inequality, ($\alpha$)<34°.

6. The link plate of claim 1, wherein said pressure angle ($\alpha$) satisfies an inequality, 32°$\leq$($\alpha$)<34°.

7. A link plate for a silent chain, in which a plurality of said link plates are arranged in lateral and longitudinal directions and joined pivotably by connecting pins, said link plate having a pair of teeth each formed of an inside flank and an outside flank and a pair of pin apertures to insert said connecting pins there into, in which, at a time of meshing of said link plate with said sprocket, a pressure angle (a) of said inside flank or said outside flank at an initial engaging point (E) satisfies an inequality, 32°$\leq$($\alpha$)<34°, said link plate having the engaging point (E) with a tooth of the sprocket, at a time of meshing of said link plate with said sprocket, on an intersection between a flank and a straight line (n) nominal to the flank, said straight line (n) and the direction of a central line connecting each center (O) of pin apertures forming the pressure angle ($\alpha$), and being in tangential contact with a circle (C), said circle (C) having a center located at a center (0) of said pin aperture and a radius (r)$\leq$0.25×(P), where (P) is a pin aperture pitch.

8. A silent chain formed of a plurality of link plates arranged in lateral and longitudinal directions and joined pivotably by connecting pins, each link plate having a pair of teeth each formed of an inside flank and an outside flank and a pair of pin apertures to insert said connecting pins thereinto, said link plate having an initial engaging point (E) with a tooth of a sprocket, at a time of meshing of said link plate with said sprocket, on an intersection between said inside flank or said outside flank and a straight line (n) normal to the inside flank or the outside flank, said straight line (n) and the direction of a central line connecting each center (O) of pin apertures forming a pressure angle ($\alpha$), and being in tangential contact with a circle (C), said circle (C) having a center located at the center (O) of said pin aperture and a radius (r)$\leq$0.25×(P), where (P) is a pin aperture pitch.

9. The chain of claim 8, in which the connecting pins are round pins, and (P) is the distance between centers of said pair of pin apertures.

10. The chain of claim 8, in which the connecting pins are a rocker pin and a joint pin in each pin aperture, and (P) is a distance between the pair of pin apertures measured between contact points of each rocker pin with each joint pin in each pin aperture when said chain is pulled straight.

11. The chain of claim 8, wherein said pressure angle ($\alpha$) satisfies an inequality, 32°$\leq$($\alpha$)<34°.

12. A silent chain formed of a plurality of link plates are arranged in lateral and longitudinal directions and joined pivotably by connecting pins, said link plate having a pair of teeth each formed of an inside flank and an outside flank and a pair of pin apertures to insert said connecting pins thereinto, in which, at a time of meshing of, said link plate with a sprocket, a pressure angle ($\alpha$) of said inside flank or said outside flank at an initial engaging point (E) satisfies an inequality, 32°$\leq$($\alpha$)<34°, said link plate having the engaging point (E) with a tooth of the sprocket, at a time of meshing of said link plate with said sprocket, on an intersection between a flank and a straight line (n) normal to the flank, said straight line (n) and the direction of a central line connecting each center (0) of pin apertures forming the pressure angle ($\alpha$), and being in tangential contact with a circle (C), said circle (C) having a center located at the center (0) of said pin aperture and a radius (r)$\leq$0.25×(P), where (P) is a pin aperture pitch.

* * * * *

UNITED STATES PATENT AND TRADEMARK OFFICE
CERTIFICATE OF CORRECTION

PATENT NO. : 7,048,664 B2 Page 1 of 1
APPLICATION NO. : 10/218731
DATED : May 23, 2006
INVENTOR(S) : Kotera It is certified that error appears in the above-identified patent and that said Letters Patent is hereby corrected as shown below:

Column 6, line 3: delete the symbol "(a)" and add the symbol -- ($\alpha$) --.

Column 6, line 13: delete the symbol "(0)" and add the symbol --(O)--.

Column 6, line 53: delete the symbol "(0)" and add the symbol --(O)--.

Column 6, line 56: delete the symbol "(0)" and add the symbol --(O)--.

Signed and Sealed this

Fifteenth Day of August, 2006

JON W. DUDAS
*Director of the United States Patent and Trademark Office*